(12) United States Patent
Crounse et al.

(10) Patent No.: US 9,438,021 B2
(45) Date of Patent: Sep. 6, 2016

(54) ORGANIZING DEVICE FOR CABLE AND WIRE

(71) Applicant: Wanho T Manufacturing Co., Ltd., Ilan (TW)

(72) Inventors: Christopher Pierre Crounse, Florence, AZ (US); Arthur C. Gagnon, Wolcott, CT (US)

(73) Assignee: Wanho T Manufacturing Co., Ltd., Ilan (TW)

(*) Notice: Subject to any disclaimer, the term of this patent is extended or adjusted under 35 U.S.C. 154(b) by 120 days.

(21) Appl. No.: 14/064,289

(22) Filed: Oct. 28, 2013

(65) Prior Publication Data

US 2015/0114710 A1    Apr. 30, 2015

(51) Int. Cl.
*H02G 3/32* (2006.01)
*H02G 3/22* (2006.01)

(52) U.S. Cl.
CPC . *H02G 3/32* (2013.01); *H02G 3/22* (2013.01)

(58) Field of Classification Search
USPC ........ 248/765, 62, 61, 69, 70, 68.1, 72, 229, 248/909, 900, 916, 548, 56; 174/48, 146, 174/152 G; 24/115 R
See application file for complete search history.

(56) References Cited

U.S. PATENT DOCUMENTS

| | | | | |
|---|---|---|---|---|
| 3,458,163 | A * | 7/1969 | Egerton-Smith | ........ H02G 3/32 174/155 |
| 4,117,259 | A * | 9/1978 | Giebel | ................. G02B 6/4445 174/78 |
| 4,330,005 | A | 5/1982 | Kjarsgaard | |
| 4,715,571 | A | 12/1987 | Soltow et al. | |
| 5,167,388 | A | 12/1992 | Blair | |
| 5,443,232 | A * | 8/1995 | Kesinger | ................ H02G 3/263 248/62 |
| 5,742,982 | A | 4/1998 | Dodd et al. | |
| 5,816,736 | A | 10/1998 | Kroulik | |
| 6,462,275 | B1 | 10/2002 | Daoud | |
| 6,736,669 | B1 | 5/2004 | Martin et al. | |
| 7,607,618 | B2 | 10/2009 | Mori et al. | |
| D655,598 | S * | 3/2012 | Hsu | ................................ D8/356 |
| 2012/0292460 | A1* | 11/2012 | Hsu | ........................ H02G 7/053 248/70 |

* cited by examiner

*Primary Examiner* — Michael F McAllister
(74) *Attorney, Agent, or Firm* — Charles E. Baxley

(57) ABSTRACT

An organizing device includes a cylindrical retainer member made of a resilient material and having one or more longitudinal grooves and spaced from each other for forming one or more partitions between the grooves of the cylindrical retainer member, and having one or more slots formed in an outer peripheral portion and communicative with the grooves for engaging a cable through the slot and into the grooves of the cylindrical retainer member. The grooves of the cylindrical retainer member include different shapes for receiving and engaging with cables of different shapes, and include a height different from each other.

5 Claims, 7 Drawing Sheets

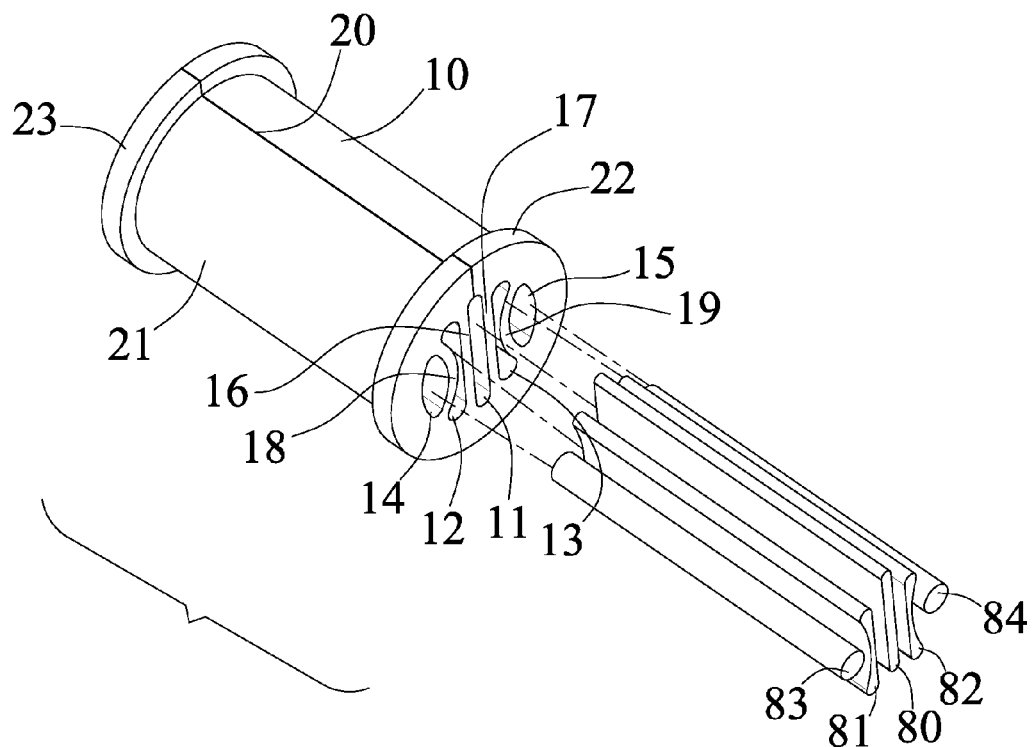
F I G. 1
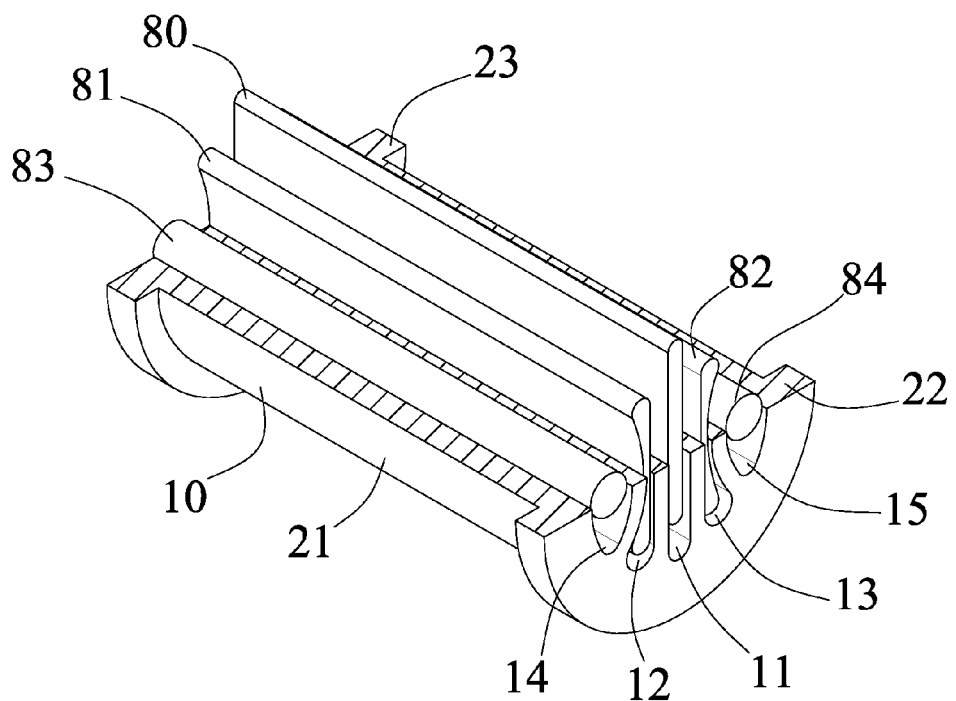
F I G. 2

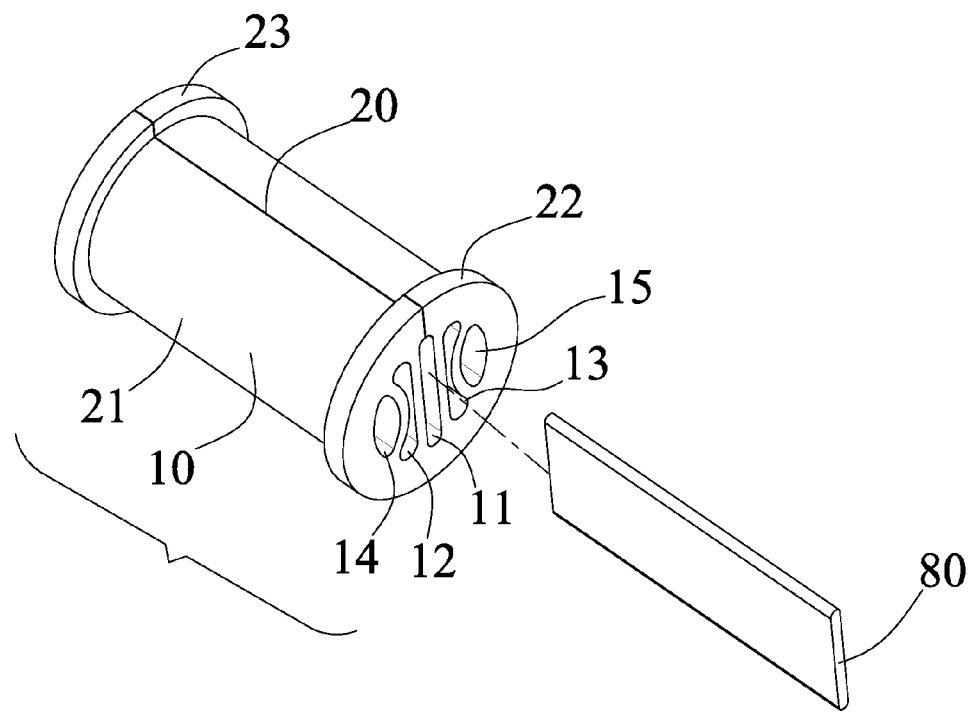
F I G. 5
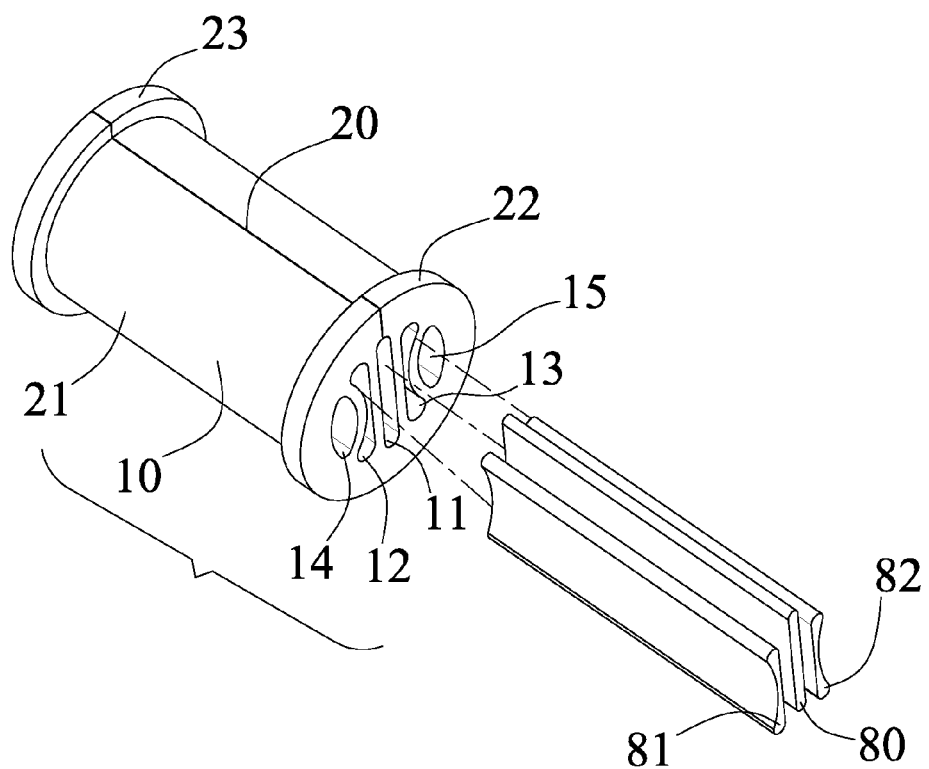
F I G. 6

ORGANIZING DEVICE FOR CABLE AND WIRE

BACKGROUND OF THE INVENTION

1. Field of the Invention

The present invention relates to an organizing device, and more particularly to a cable and wire organizing device including a structure or configuration for allowing the cables and the wires to be easily and quickly engaged into the organizing device and to be easily and quickly attached or mounted or secured to various supporting facilities with the organizing device.

2. Description of the Prior Art

Typical cable organizing devices comprise a back mounting block for attaching or mounting or securing to various supporting apparatuses or facilities, the back mounting block includes a number of slots formed therein for receiving or engaging with the cables and the wires, and a front cap attached or mounted or secured to the back mounting block for clamping and retaining the cables and the wires between the back mounting block and the front cap.

For example, U.S. Pat. No. 4,330,005 to Kjarsgaard, U.S. Pat. No. 4,715,571 to Soltow et al., U.S. Pat. No. 5,167,388 to Blair, U.S. Pat. No. 5,443,232 to Kesinger et al., U.S. Pat. No. 5,742,982 to Dodd et al., U.S. Pat. No. 5,816,736 to Kroulik, U.S. Pat. No. 6,462,275 to Daoud, U.S. Pat. No. 6,736,669 to Martin et al., and U.S. Pat. No. 7,607,618 to Mori et al. disclose several of the typical cable organizing devices each comprising a front part and a rear part including a number of slots formed therein for receiving or engaging with the cables and the wires, and a bracket attached or mounted or secured to the rear part for clamping and retaining the cables and the wires between the bracket and the rear part.

However, the front caps and the brackets should be removed and separated from the back mounting blocks and the rear parts before the cables and the wires may be disposed or attached or engaged into the slots that are formed between the back mounting block and the front cap or between the bracket and the rear part. In addition, the typical cable organizing devices may not stably anchor and retain the cables and the wires of different sizes or diameters or dimensions to the typical cable organizing devices, and the cables and the wires may have a good chance to be disengaged from the typical cable organizing devices.

The present invention has arisen to mitigate and/or obviate the afore-described disadvantages of the conventional cable and wire organizing devices.

SUMMARY OF THE INVENTION

The primary objective of the present invention is to provide a cable organizing device including a structure or configuration for allowing the cables and the wires to be easily and quickly engaged into the organizing device and to be easily and quickly attached or mounted or secured to various supporting facilities with the organizing device.

In accordance with one aspect of the invention, there is provided a cable organizing device comprising a cylindrical retainer member made of a resilient material and including a first groove, at least one second groove and at least one third groove longitudinally formed therein and spaced from each other for forming a first partition between the first and the third grooves of the cylindrical retainer member and a second partition between the third and the second grooves of the cylindrical retainer member, and including at least one slot formed in an outer peripheral portion of the cylindrical retainer member and communicating with the first groove of the cylindrical retainer member for engaging a cable through the slot and into the first groove of the cylindrical retainer member and for resiliently engaging with the cable and thus for solidly and stably anchoring or retaining or positioning the cable in the cylindrical retainer member.

The cylindrical retainer member includes at least one flange for forming an engaging member and for solidly and stably engaging with a coupling member or coupling barrel or sleeve. The first and the second and the third grooves of the cylindrical retainer member include different shapes for receiving and engaging with cables of different shapes.

The first groove of the cylindrical retainer member includes a height greater than that of the second and the third grooves of the cylindrical retainer member for receiving and engaging with cables of different heights. The third groove of the cylindrical retainer member includes a height greater than that of the second groove of the cylindrical retainer member for receiving and engaging with cables of different heights.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial exploded view illustrating the operation of a cable organizing device in accordance with the present invention;

FIG. 2 is a perspective view of the cable organizing device, in which one half of the cable organizing device has been cut off for showing the inner structure of the cable organizing device;

FIGS. 5, 6 are partial exploded views similar to FIG. 1, illustrating the operation of the cable organizing device;

DETAILED DESCRIPTION OF THE PREFERRED EMBODIMENT

Figure 3:
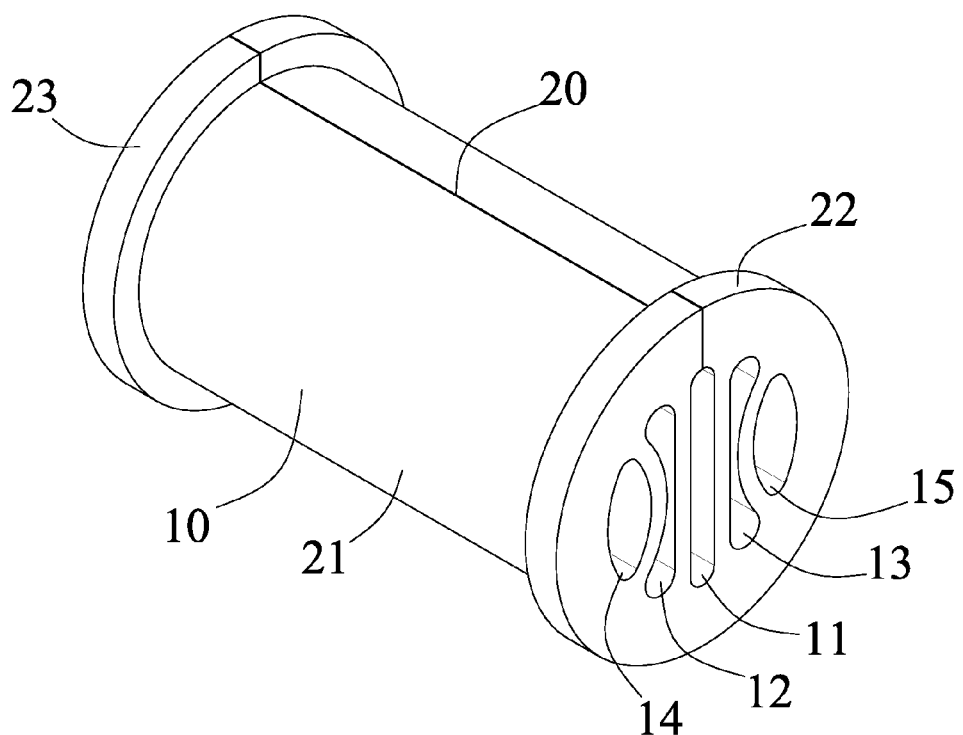
FIG. 3 is a perspective view of the cable organizing device.
Figure 4:
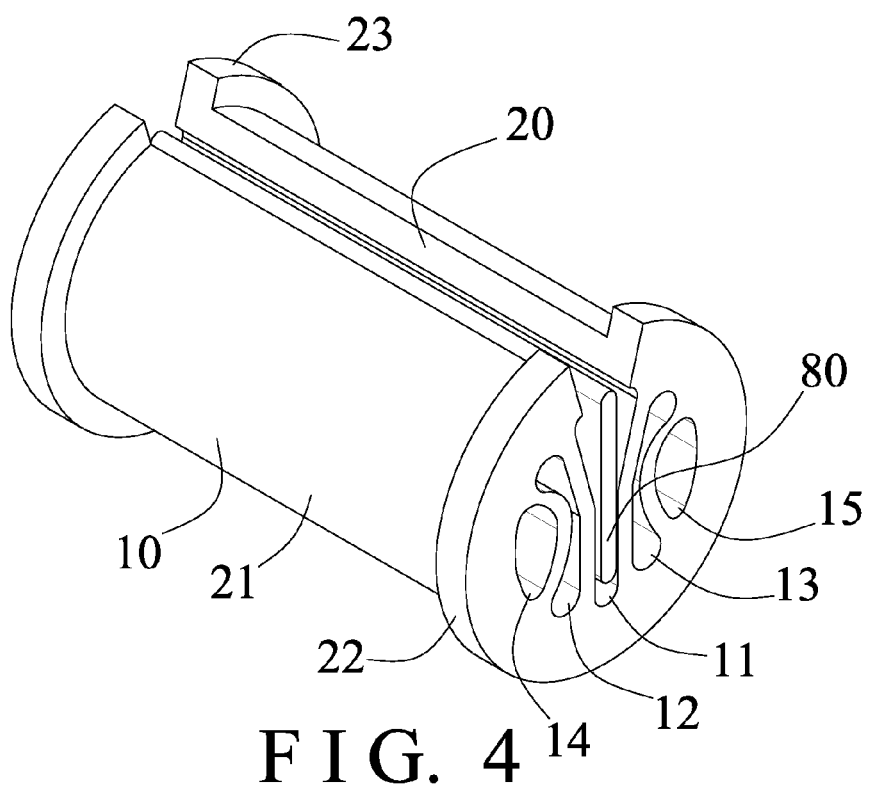
FIG. 4 is another perspective view similar to FIG. 3, illustrating the operation of the cable organizing device.

Referring to the drawings, and initially to FIGS. 1-3, a cable organizing device in accordance with the present invention comprises a cylindrical retainer body or member 10 including one or more channels or grooves 11, 12, 13, 14, 15 longitudinally formed therein and separated or spaced from each other for receiving or engaging with the cables 80, 81, 82 and/or the wires 83, 84 (FIGS. 4-6), for example, the middle or intermediate or first groove 11 of the cylindrical retainer member 10 includes a length or dimension or size or height greater than that of the other grooves 12-15, and the two outermost or second grooves 14-15 of the cylindrical retainer member 10 include a length or dimension or size or height smaller than that of the other grooves 11-13, and the other or third grooves 12-13 of the cylindrical retainer member 10 include a length or dimension or size or height smaller than that of the middle or intermediate or first groove 11, but greater than that of the outermost or second grooves 14-15 of the cylindrical retainer member 10.

The grooves 11-15 of the cylindrical retainer member 10 include the shapes or contours or lengths or heights or widths or diameters or dimensions or sizes different from each other for receiving or engaging with the cables 80, 81, 82 and/or the wires 83, 84 (FIGS. 1-2) of different shapes or contours or lengths or heights or widths or diameters or dimensions or sizes respectively. For example, the first groove 11 of the cylindrical retainer member 10 and the first cable 80 include a greatest length or height than the others, and the second grooves 14-15 of the cylindrical retainer member 10 and the wires 83, 84 include a length or height or width smaller than that of the other grooves 11-13 of the cylindrical retainer member 10 and the cables 80-82, and the third grooves 12-13 of the cylindrical retainer member 10 and the second cables 81-82 include a length or height or width smaller than that of the first groove 11 and the first cable 80, but greater than that of the second grooves 14-15 and the wires 83, 84.

Figure 7:
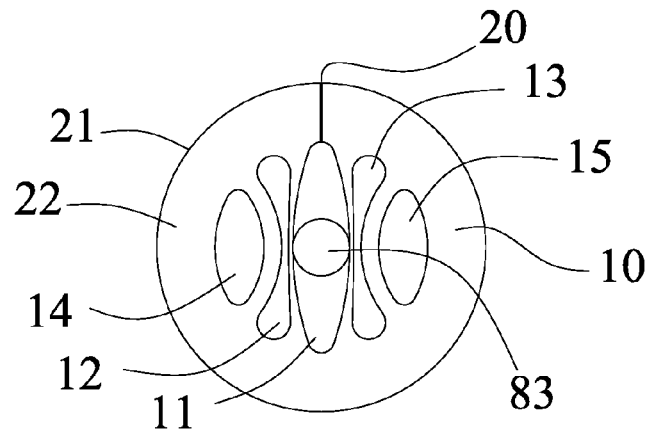
FIGS. 7, 8, 9 are end plan schematic views illustrating the operation of the cable organizing device.
Figure 8:
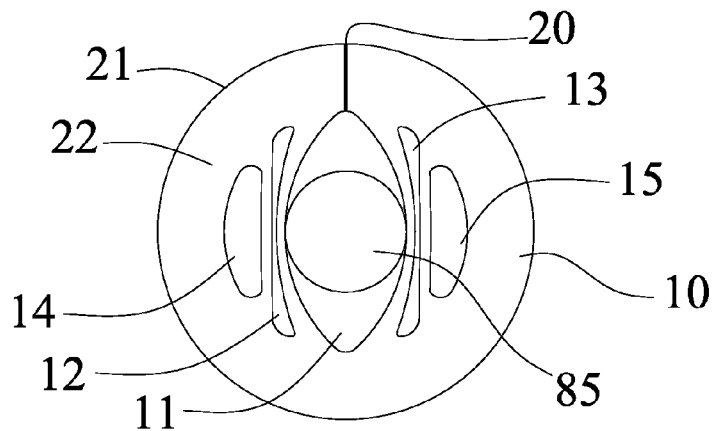
Figure 9:
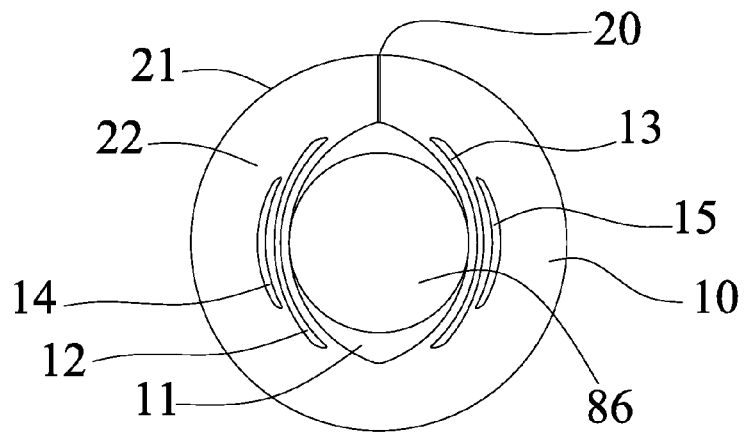
Figure 10:
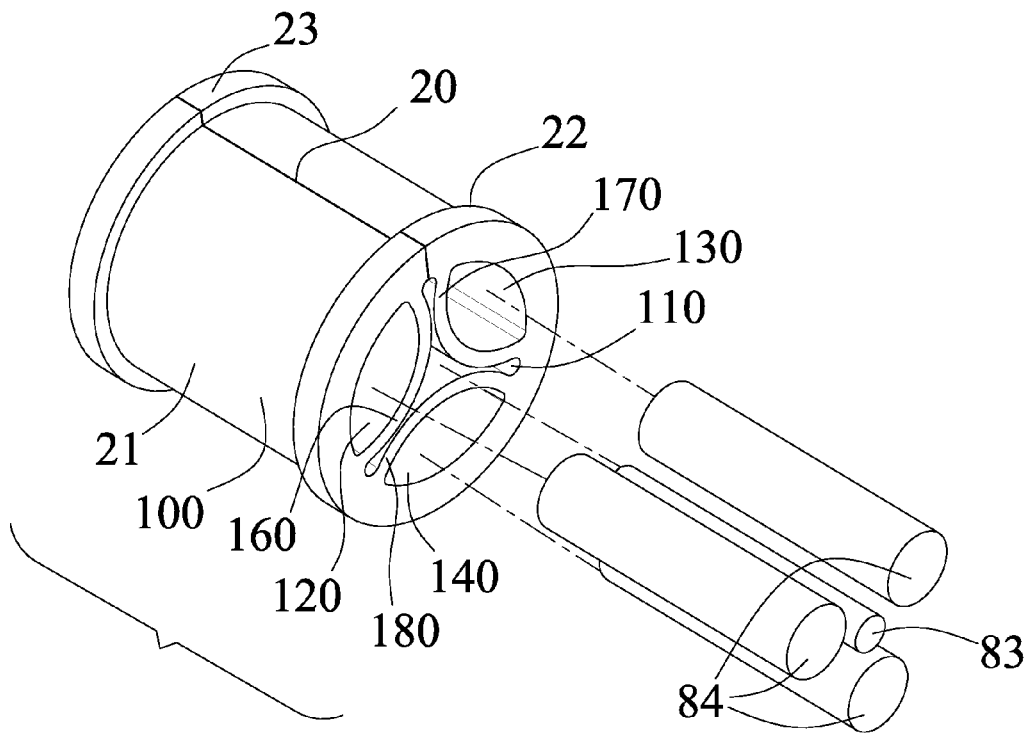
FIG. 10 is a further partial exploded view similar to FIGS. 1, 5-6, illustrating the other arrangement of the cable organizing device.
Figure 11:
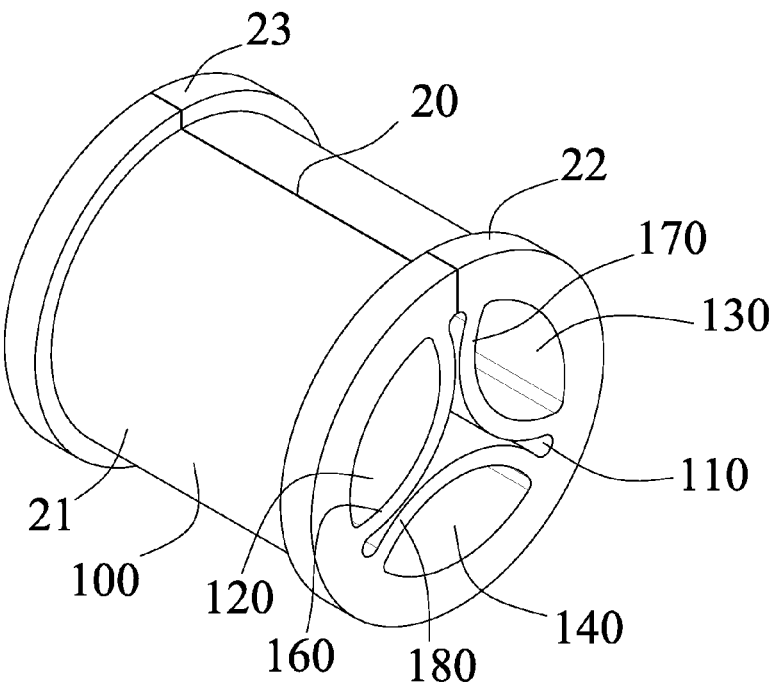
FIG. 11 is a perspective view of the cable organizing device as shown in FIG. 10.
Figure 12:
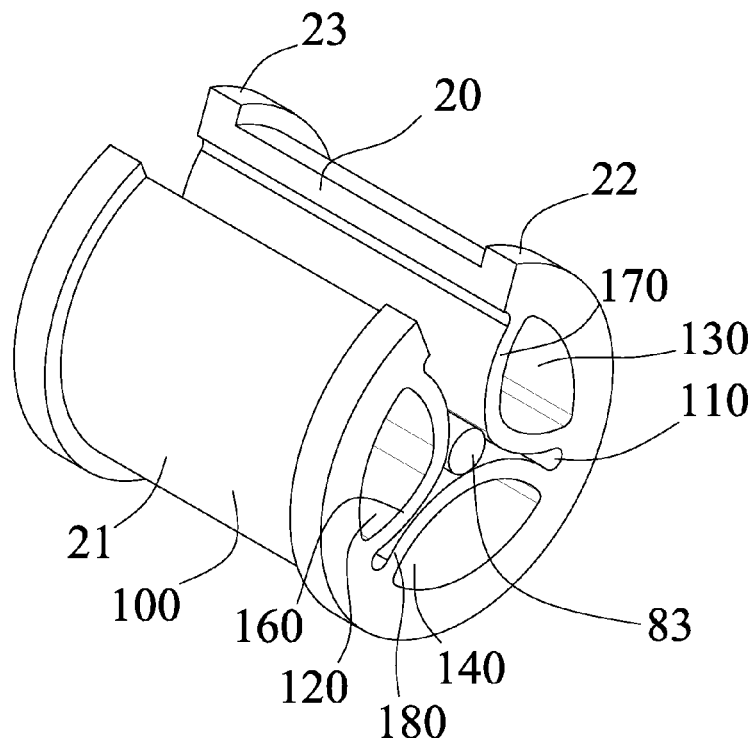
FIG. 12 is another perspective view similar to FIG. 11, illustrating the operation of the cable organizing device as shown in FIGS. 10-11.
Figure 13:
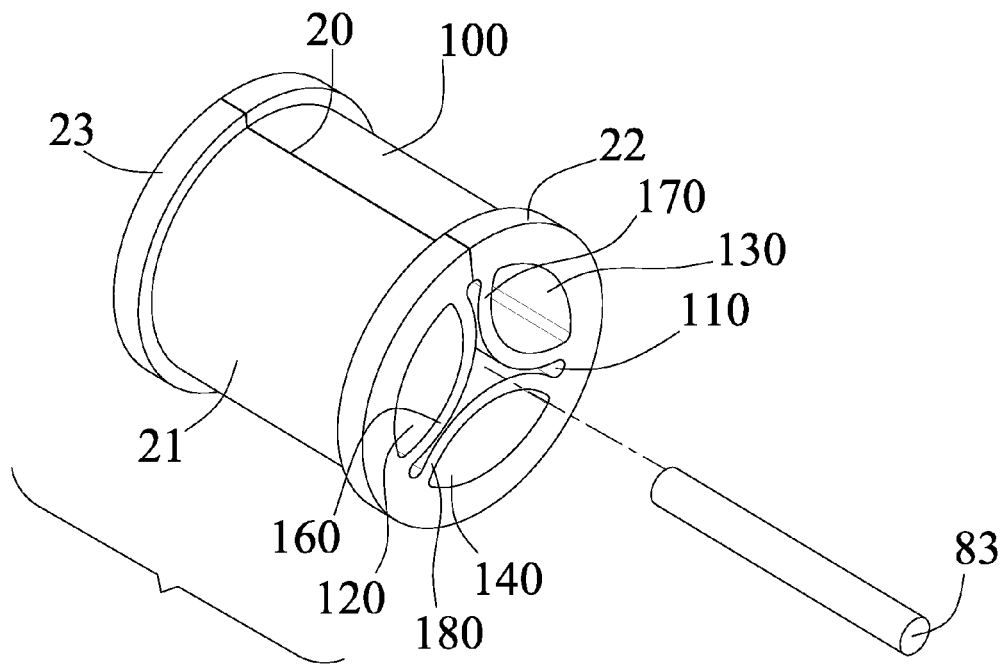
FIG. 13 is a further partial exploded view similar to FIG. 10, illustrating the operation of the cable organizing device as shown in FIGS. 10-12.
Figure 14:
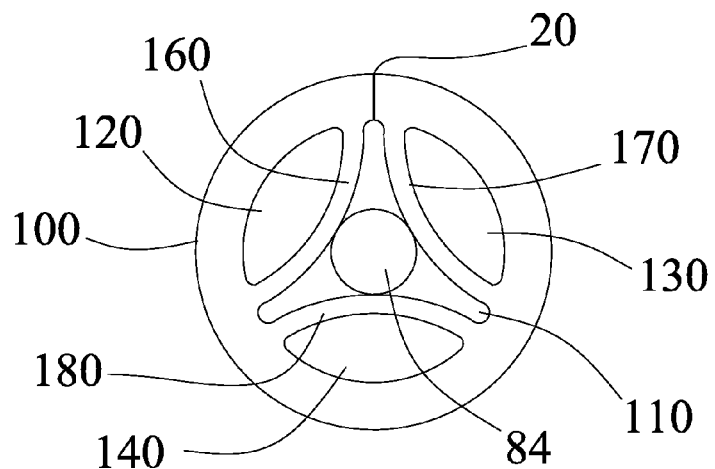
FIGS. 14, 15, 16 are end plan schematic views illustrating the operation of the selected cable organizing device as shown in FIGS. 10-13.
Figure 15:
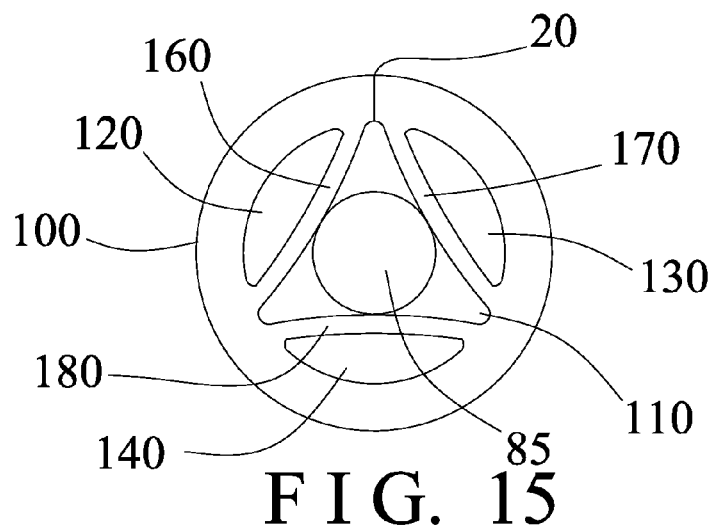
Figure 16:
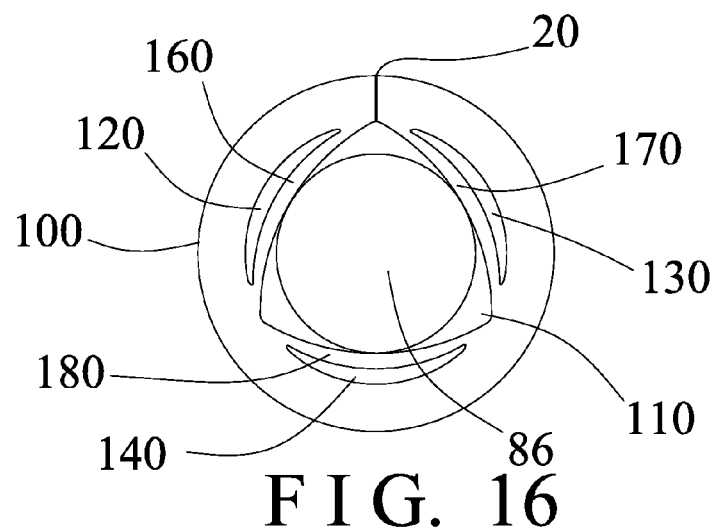

The grooves 11-15 of the cylindrical retainer member 10 are separated or spaced from each other for forming or defining a rib or flap or partition 16, 17, 18, 19 between the adjacent grooves 11-15, for example, the partitions 16, 17 are formed or defined or provided between the first groove 11 and the third grooves 12-13 of the cylindrical retainer member 10 respectively, and the other partitions 16, 17 are formed or defined or provided between the third grooves 12-13 and the second grooves 14-15 of the cylindrical retainer member 10 respectively, and the cylindrical retainer member 10 is made of soft or resilient rubber or plastic materials for allowing the partitions 16-19 to be suitably deformed or folded and thus for allowing the dimension or size or width of the grooves 11-15 of the cylindrical retainer member 10 to be suitably deformed or widened or narrowed for receiving or engaging with the cables and/or the wires 83, 85, 86 (FIGS. 7-9) of different shapes or contours or diameters or dimensions or sizes.

The cylindrical retainer member 10 includes one or more slots 20 formed in the outer peripheral portion 21 thereof and intersecting or communicative with either of the grooves 11 for allowing the cables 80-82 and/or the wires 83-84 (FIGS. 4-7) to be easily and quickly engaged through the slot 20 and then engaged into the groove 11 of the cylindrical retainer member 10 of the organizing device. The cylindrical retainer member 10 further includes a lower and outer peripheral flange 22 and/or an upper and outer peripheral flange 23 or two end peripheral flanges 22, 23 for engaging with a coupling member or coupling barrel or sleeve (not illustrated) and for solidly and stably anchoring or securing or retaining the coupling member to the cylindrical retainer member 10 and for preventing the coupling member from being disengaged from the cylindrical retainer member 10. It is to be noted that the cylindrical retainer member 10 may resiliently engage with the cables 80-82 and the wires 83-84 for solidly and stably anchoring or securing or retaining the cables 80-82 and the wires 83-84 in the cylindrical retainer member 10.

Alternatively, as shown in FIGS. 10-16, the cylindrical retainer member 100 includes one or more channels or grooves 110, 120, 130, 140 longitudinally formed therein and separated or spaced from each other, for receiving or engaging with the cables and/or the wires 83, 84, 85, 86, for example, the middle or intermediate or central or first groove 110 of the cylindrical retainer member 100 includes a dimension or size or standard or shape or contour, such as a substantially triangular structure different from that of the other grooves 120, 130, 140, such as a substantially oval or elliptical shape or contour or structure, and the middle or intermediate or central or first groove 110 of the cylindrical retainer member 100 is located within or between or among the other grooves 120, 130, 140 of the cylindrical retainer member 100 for forming or defining a flexible rib or flap or partition 160, 170, 180 between or among the adjacent grooves 110, 120, 130, 140.

The cylindrical retainer member 100 also includes one or more slots 20 formed in the outer peripheral portion 21 thereof and intersecting or communicative with either of the grooves 110 for allowing the cables and/or the wires 83-86 to be easily and quickly engaged through the slot 20 and then engaged into the groove 110 of the cylindrical retainer member 100 of the organizing device. The cylindrical retainer member 100 further includes a lower and outer peripheral flange 22 and/or an upper and outer peripheral flange 23 or two end peripheral flanges 22, 23 for engaging with a coupling member or coupling barrel or sleeve (not illustrated) and for solidly and stably anchoring or securing or retaining the coupling member to the cylindrical retainer member 100 and for preventing the coupling member from being disengaged from the cylindrical retainer member 100.

Accordingly, the cable organizing device includes a structure or configuration for allowing the cables and the wires to be easily and quickly engaged into the organizing device and to be easily and quickly attached or mounted or secured to various supporting facilities with the organizing device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An organizing device comprising: a cylindrical retainer member is made of a resilient material and including a first groove, a second groove and at least one third groove longitudinally formed therein and spaced from each other for forming a first partition which is formed and located between said first and said second grooves of said cylindrical retainer member and a second partition which is formed and located between said at least one third and said first grooves of said cylindrical retainer member, and said cylindrical retainer member including at least one slot formed in an outer peripheral portion of said cylindrical retainer member and communicating with said first groove of said cylindrical retainer member for engaging a cable through said at least one slot and into said first groove of said cylindrical retainer member and for allowing the cable to be resiliently retained between said first and said second partitions.

2. The organizing device as claimed in claim 1, wherein said cylindrical retainer member includes at least one flange for forming an engaging member.

3. The organizing device as claimed in claim 1, wherein said first and said second and said at least one third grooves of said cylindrical retainer member include different shapes for receiving and engaging with cables of different shapes.

4. The organizing device as claimed in claim 1, wherein said first groove of said cylindrical retainer member includes a height greater than that of said second and said at least one third grooves of said cylindrical retainer member.

5. The organizing device as claimed in claim 4, wherein said at least one third groove of said cylindrical retainer member includes a height greater than that of said second groove of said cylindrical retainer member.

* * * * *